United States Patent
Davis, Jr. et al.

(10) Patent No.: US 6,851,704 B2
(45) Date of Patent: Feb. 8, 2005

(54) AIR BAG ASSEMBLY

(75) Inventors: Joseph J. Davis, Jr., Ortonville, MI (US); Michael J. Hier, Royal Oak, MI (US)

(73) Assignee: Lear Corporation, Southfield, MI (US)

( * ) Notice: Subject to any disclaimer, the term of this patent is extended or adjusted under 35 U.S.C. 154(b) by 64 days.

(21) Appl. No.: 10/144,631

(22) Filed: May 13, 2002

(65) Prior Publication Data

US 2003/0209888 A1 Nov. 13, 2003

(51) Int. Cl.$^7$ ............................................. B60R 21/26
(52) U.S. Cl. ...................................................... 280/728.3
(58) Field of Search ......................... 280/728.3, 728.2, 280/728.1

(56) References Cited

U.S. PATENT DOCUMENTS

| | | | | |
|---|---|---|---|---|
| 3,708,181 A | | 1/1973 | Mazelsky | |
| 4,941,678 A | | 7/1990 | Lauritzen et al. | |
| 5,060,972 A | * | 10/1991 | Satoh et al. | 280/732 |
| 5,439,246 A | * | 8/1995 | Ravenberg et al. | 280/728.3 |
| 5,454,586 A | | 10/1995 | Rogerson | |
| 5,470,105 A | | 11/1995 | Rose et al. | |
| 5,482,313 A | | 1/1996 | Ikeya et al. | |
| 5,556,126 A | | 9/1996 | Lee | |
| 5,588,669 A | * | 12/1996 | Leonard et al. | 280/728.3 |
| 5,588,675 A | | 12/1996 | Lotspih | |
| 5,676,393 A | | 10/1997 | Rose | |
| 5,755,459 A | | 5/1998 | LaLonde | |
| 5,775,724 A | | 7/1998 | Tonooka et al. | |
| 5,791,680 A | | 8/1998 | Dyer | |
| 5,794,967 A | * | 8/1998 | Manire | 280/728.3 |
| 5,904,367 A | * | 5/1999 | Warnez et al. | 280/728.3 |
| 5,915,724 A | | 6/1999 | Daris et al. | |
| 5,979,929 A | | 11/1999 | Stanger et al. | |
| 6,022,043 A | | 2/2000 | Harnisch et al. | |
| 6,047,986 A | | 4/2000 | Ishikawa et al. | |
| 6,068,286 A | * | 5/2000 | Heilig | 280/728.3 |
| 6,158,763 A | | 12/2000 | Dominique et al. | |
| 6,203,056 B1 | | 3/2001 | Labrie et al. | |
| 6,345,837 B1 | * | 2/2002 | Warnez et al. | 280/728.3 |

FOREIGN PATENT DOCUMENTS

| | | | | |
|---|---|---|---|---|
| JP | 2001163150 A | * | 6/2001 | B60R/21/20 |
| WO | WO 99/29539 | | 6/1999 | |

* cited by examiner

*Primary Examiner*—Son T. Nguyen
(74) *Attorney, Agent, or Firm*—Bill C. Panagos

(57) ABSTRACT

An air bag assembly, for mounting on a panel having a recess, includes an air bag adapted to be positioned in the recess, and an inflator associated with the air bag for inflating the air bag. The inflator is further adapted to be positioned in the recess and mounted to the panel. The assembly also includes a cover configured to cover the air bag and to release the air bag when the air bag is inflated. The cover has a side wall with an enlarged end, and the enlarged end is configured to be trapped between the inflator and the panel when the inflator is mounted to the panel, so as to secure the cover to the panel.

27 Claims, 3 Drawing Sheets

AIR BAG ASSEMBLY

BACKGROUND OF THE INVENTION

1. Field of the Invention

The invention relates to air bag assemblies for use with motor vehicles.

2. Background Art

U.S. Pat. No. 5,482,313 discloses an air bag assembly that is mounted in an opening of an instrument panel. The air bag assembly includes an air bag, an inflator configured to inflate the air bag, and a housing that receives the air bag and inflator. The air bag assembly further includes a lid or cover for covering the air bag and inflator, and the cover is attached to the housing with a plurality of hook fasteners. Because the air bag assembly includes a separate housing, and further requires separate fasteners for attaching the cover to the housing, the air bag assembly is costly and time consuming to manufacture.

SUMMARY OF THE INVENTION

The invention addresses the shortcomings of the prior art by providing an air bag assembly that may be provided without a separate housing. Futhermore, the air bag assembly of the invention includes a cover that may be attached to a panel, such as an instrument panel, without fasteners.

Under the invention, an air bag assembly is provided for mounting on a panel having a recess. The assembly includes an air bag adapted to be positioned in the recess, and an inflator associated with the air bag for inflating the air bag. The inflator is further adapted to be positioned in the recess and mounted to the panel. The assembly also includes a cover configured to cover the air bag and to release the air bag when the air bag is inflated. The cover has a side wall with an enlarged end, and the enlarged end is configured to be trapped between the inflator and the panel when the inflator is mounted to the panel, so as to secure the cover to the panel.

DETAILED DESCRIPTION OF THE PREFERRED EMBODIMENTS

Figure 1:
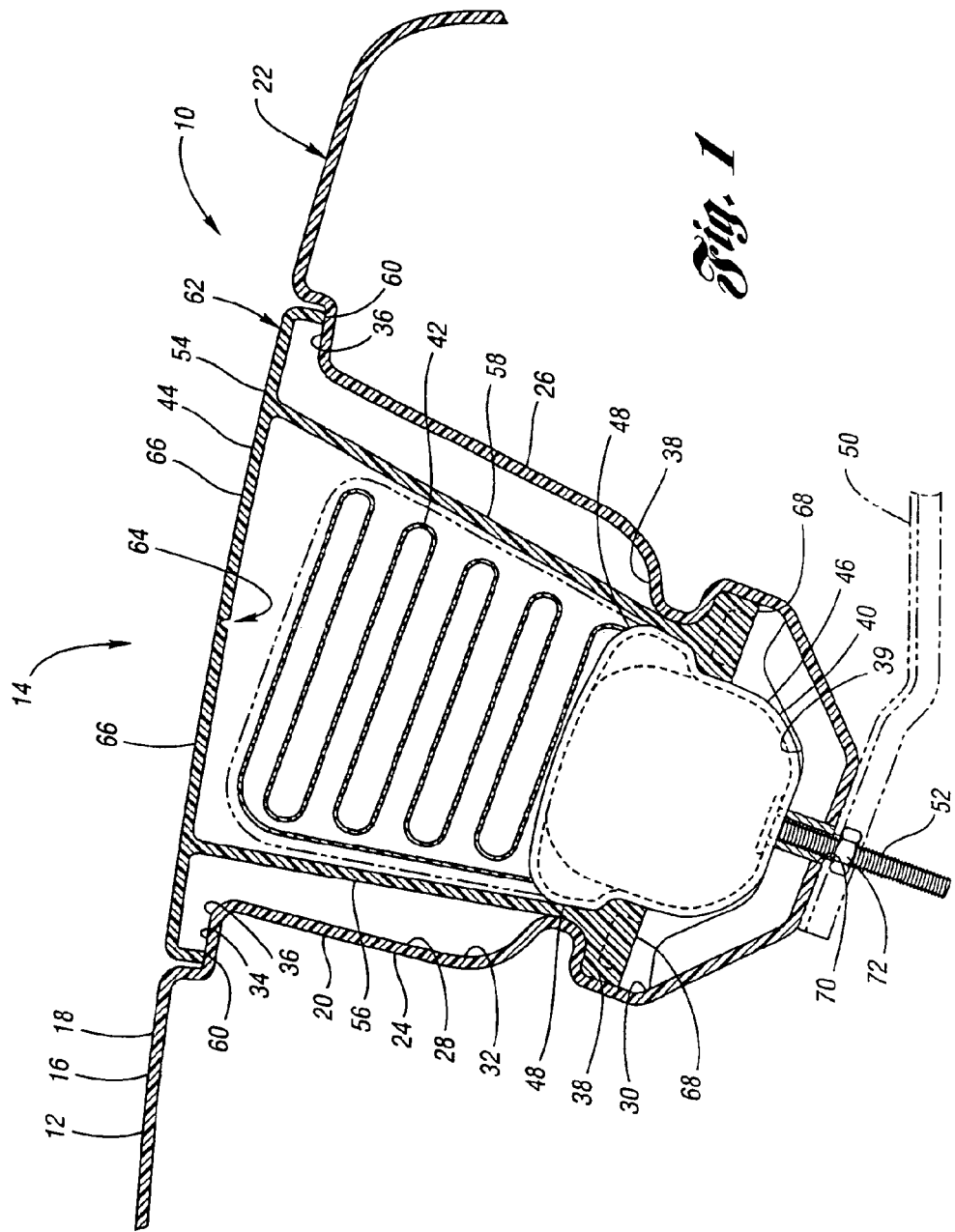
FIG. 1 is a cross-sectional view of an air bag system including an air bag assembly attached to an instrument panel of a motor vehicle, wherein the air bag assembly includes an air bag, an inflator connected to the air bag, and a cover for covering the air bag and inflator.

FIG. 1 shows an air bag system 10 for use with a motor vehicle. The system 10 includes a vehicle interior panel, such as an instrument panel 12, and an air bag assembly 14 mounted to the instrument panel 12. The instrument panel 12 includes a support panel or retainer 16 that may be configured to support various components, such as instrument clusters, a glove compartment, etc. The retainer 16 includes a main portion 18 and an indented portion 20 extending from the main portion 18. The main portion 18 defines an appearance surface 22 that is visible from an interior compartment of the vehicle (not shown).

The indented portion 20 has first and second retainer side walls 24 and 26, respectively, that cooperate to define a recess 28 having first, second and third recess portions 30, 32 and 34, respectively. Each retainer side wall 24 and 26 further defines a shoulder 36 and a retainer projection 38. In the embodiment shown in FIG. 1, the first recess portion 30 extends below the retainer projections 38, the second recess portion 32 extends between the first recess portion 30 and the shoulders 36, and the third recess portion 34 extends above the shoulders 36. As further shown in FIG. 1, the retainer side walls 24 and 26 are joined together and cooperate to define one or more positioning ribs 39.

The retainer 16 may be made in any suitable manner and include any suitable materials. For example, the retainer 16 may comprise a molded plastic retainer body, and one or more cover materials attached to the retainer body for forming the appearance surface. In one embodiment of the invention, the retainer body is made of poly-carbonate, acrylonitrile butadiene styrene. The cover materials, which may include leather, vinyl, thermoplastic polyolefin, or any other suitable cover material, may be provided with or without an intermediate layer or backing layer, such as a foam backing layer. Alternatively, the retainer 16 may be provided without any cover materials. In such case, the retainer body may be formed to define the appearance surface 22.

Alternatively, the vehicle interior panel may be any suitable interior trim panel having similar features as described above with respect to the instrument panel 12. For example, the vehicle interior panel may be a door panel, knee bolster panel, headliner panel, etc.

The air bag assembly 14 includes an inflator 40, an inflatable device such as an air bag 42 in communication with, or otherwise associated with, the inflator 40, and a cover 44 for covering the air bag 42. The inflator 40, which is configured to inflate the air bag 42 upon actuation by a control device (not shown), is connected to the indented portion 20 of the retainer 16 such that the inflator 40 is disposed at least partially in the first recess portion 30. The inflator 40 may also engage one or more of the positioning ribs 39, which are configured to accurately position the inflator 40 within the recess 28. In the embodiment shown in FIG. 1, the inflator 40 includes an inflator body 46 having two inflator projections 48. Furthermore, the inflator 40 may be connected to the retainer 16, as well as to a mounting bracket 50, with one or more fasteners 52, such as threaded studs or bolts. Mounting bracket 50 may be connected to a support structure, such as a cross-car beam (not shown), and is configured to provide support to the air bag assembly 14.

Figure 2:
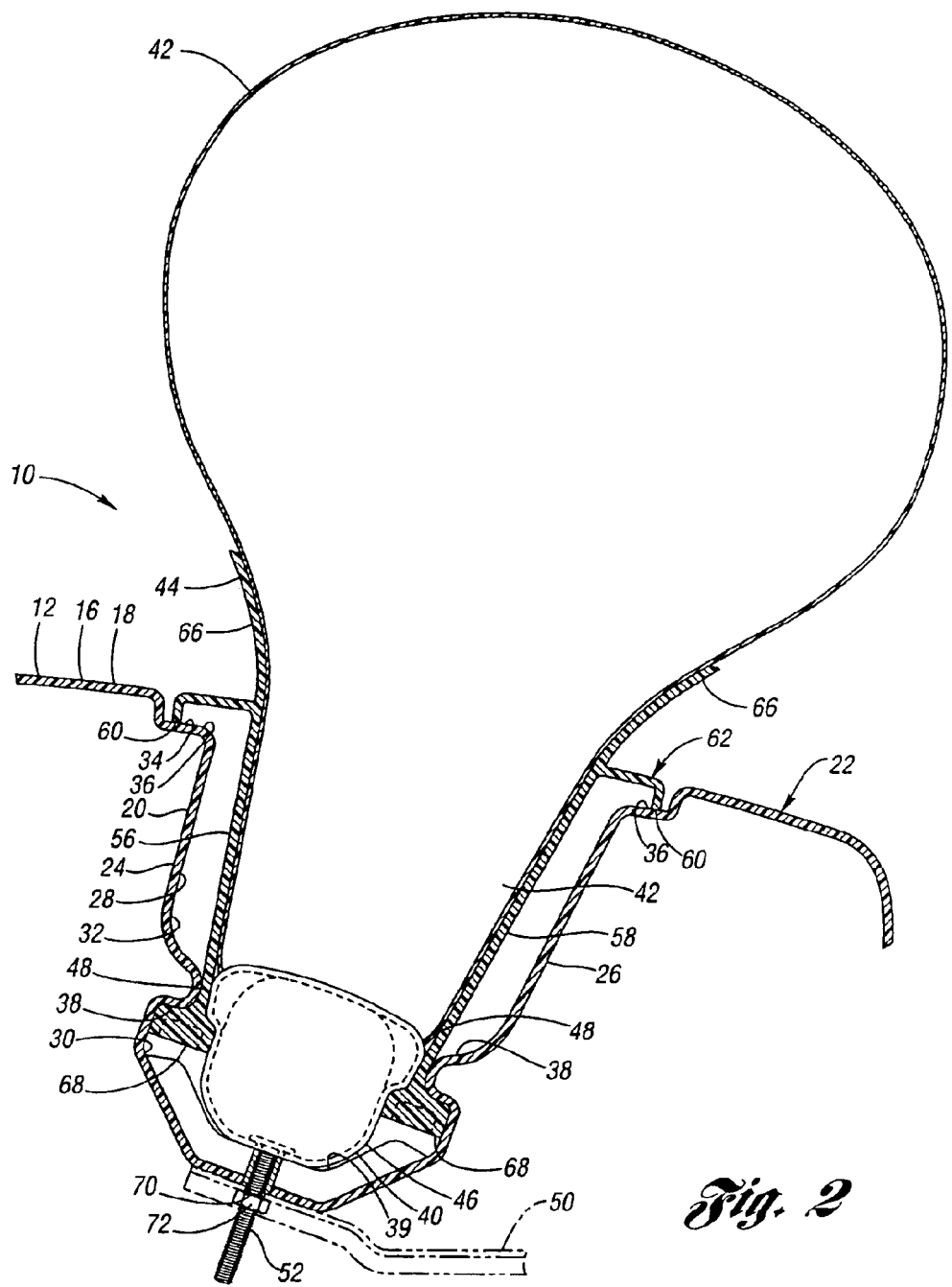
FIG. 2 is a cross-sectional view of the system of FIG. 1 with the air bag shown in a deployed position.

In one embodiment of the invention, the air bag 42 is connected to the inflator 40 and is configured to be inflated by the inflator 40 such that the air bag 42 extends through the cover 44 when sufficiently inflated, as shown in FIG. 2. Prior to inflation, when the air bag 42 is in a stored position, the air bag 42 is disposed at least partially in the second recess portion 32, as shown in FIG. 1.

The cover 44 includes a main or top portion 54 and first and second side walls 56 and 58, respectively, extending from the top portion 54. In the embodiment shown in FIG. 1, the top portion 54 is disposed at least partially in the third recess portion 34 and includes bent edges 60 that are engaged with the shoulders 36. The top portion 54 also defines an appearance surface 62 that is disposed adjacent to the appearance surface 22 of the retainer 16. Furthermore, the top portion 54 is configured to release the air bag 42 when the air bag 42 is sufficiently inflated or deployed. For example, referring to FIGS. 1 and 2, the top portion 54 may include a tear seam 64 that is breakable upon inflation of the air bag 42. With such a configuration, the top portion 54 may be considered to define two doors 66 that open when the air bag 42 is deployed, as shown in FIG. 2.

Each side wall 56 and 58 extends between a respective retainer projection 38 and a respective inflator projection 48. Each side wall 56 and 58 further has an enlarged end 68 disposed in the first recess portion 30. Each enlarged end 68 is engaged with a respective retainer projection 38 and a respective inflator projection 48, such that the enlarged ends 68 are trapped between the inflator 40 and the retainer 16 to thereby secure the cover 44 to the retainer 16. Advantageously, referring to FIG. 2, the side walls 56 and 58 also function as tethers to sufficiently retain the top portion 54 during deployment of the air bag 42.

The cover 44 may be made of any suitable material, such as a flexible plastic material. In one embodiment of the invention, the cover 44 is made of thermoplastic urethane. Such material is sufficiently flexible to allow the doors 66 to flex open upon deployment of the air bag 42.

Figure 3:
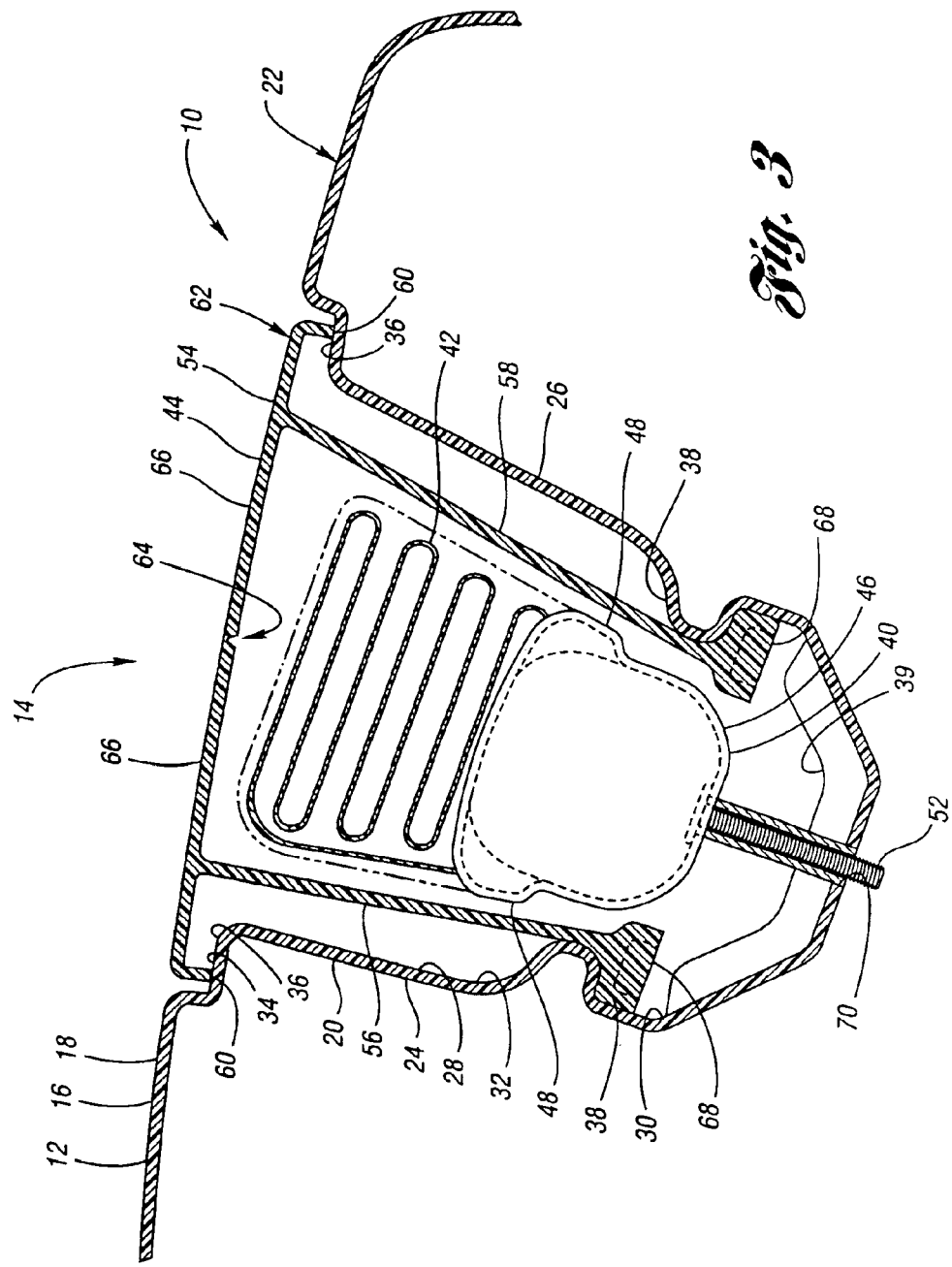
FIG. 3 is a cross-sectional view of the system of FIG. 1, showing the inflator in a raised position to allow the cover to be positioned with respect to the instrument panel.

Referring to FIGS. 1 and 3, an example assembly procedure for the system 10 will now be described. First, the fasteners 52 may be attached to the inflator body 46, such as by welding the fasteners 52 to the inflator body 46. Next, the cover 44 may be placed over the inflator 40 and air bag 42 to form the air bag assembly 14. The air bag assembly 14 may then be positioned in the recess 28 such that the enlarged ends 68 extend into the first recess portion 30, as shown in FIG. 3. During this step, the fasteners 52 may be positioned in apertures 70 formed in the indented portion 20 of the retainer 16, such that the fasteners 52 may be used to manually support the inflator 40 in a raised position, which is shown in FIG. 3. Next, the fasteners 52 are pulled through the apertures 70 until the inflator 40 is seated against the positioning ribs 39, as shown in FIG. 1. The position of the inflator 40 shown in FIG. 1 may be referred to as a mounted position.

Alternatively, the inflator 40 may be supported in the raised position in any suitable manner. For example, guide elements such as guide tubes may be inserted through the apertures 70 and onto the fasteners 52, such that the guide tubes may be used to support the inflator 40 in the raised position. Such guide tubes may then be used to guide the fasteners 52 through the apertures 70 as the inflator 40 is lowered to the mounted position.

The fasteners 52 may then be secured to the retainer 16 and/or mounting bracket 50 to thereby secure the air bag assembly 14 to the retainer 16. For example, the fasteners 52 may be secured to the retainer 16 and/or mounting bracket 50 with nuts 72. As another example, the fasteners 52 may be welded to the mounting bracket 50. As yet another example, the fasteners 52 may first be secured to the retainer 16 such as with nuts 72, and then the fasteners 52 may be welded or otherwise secured to the mounting bracket 50. When the inflator 40 is sufficiently secured to the retainer 16, the enlarged ends 68 of the cover 44 are trapped between the retainer 16 and the inflator 40. As a result, the cover 44 may be secured to the retainer 16 without requiring separate fasteners to directly attach the cover 44 to the retainer 16.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An air bag assembly for mounting on a panel having a recess, the assembly comprising:

an air bag adapted to be positioned at least partially in the recess;

an inflator associated with the air bag for inflating the air bag, the inflator being adapted to be positioned at least partially in the recess and mounted to the panel; and a cover configured to cover the air bag and to release the air bag when the air bag is inflated, the cover having a side wall with an enlarged end, the enlarged end and the inflator being configured such that the enlarger end is able to be trapped by and between the inflator and the panel when the inflator is mounted to the panel, so as to secure the cover to the panel.

2. The air bag assembly of claim 1 wherein the inflator has an inflator body including a projection that is engageable with the enlarged end when the inflator is mounted to the panel.

3. The air bag assembly of claim 2 wherein the panel includes first and second side walls, the projection of the inflator is configured to be positioned closer to the first side wall than the second side wall when the inflator is mounted to the panel, and the enlarged end is configured to be trapped between the projection and the first side wall when the inflator is mounted to the panel.

4. The air bag assembly of claim 2 wherein the projection is engageable with the enlarged end when the inflator is mounted to the panel in a mounted position, and wherein the projection is configured to be disengaged from the enlarged end when the inflator is disposed at least partially in the recess in a raised position different than the mounted position.

5. The air bag assembly of claim 1 wherein the cover includes an additional side wall having an additional enlarged end, the additional enlarged end being configured to be trapped between the inflator and the panel when the inflator is mounted to the panel.

6. The air bag assembly of claim 5 wherein the inflator has an inflator body including two projections that are engageable with the enlarged ends when the inflator is mounted to the panel, and wherein each enlarged end is configured to be engaged with a respective projection and trapped between the respective projection and the panel when the inflator is mounted to the panel.

7. The air bag assembly of claim 5 wherein each enlarged end is configured to engage the inflator and the panel when the inflator is mounted to the panel.

8. The air bag assembly of claim 1 wherein the enlarged end is engageable with the inflator when the inflator is mounted to the panel.

9. The air bag assembly of claim 1 wherein the enlarged end is engageable with the inflator and the panel when the inflator is mounted to the panel.

10. The air bag assembly of claim 1 wherein the enlarged end is configured to extend into the recess and to be sandwiched between the inflator and the panel, such that the enlarged end is engaged with the inflator and the panel, when the inflator is mounted to the panel.

11. The air bag assembly of claim 1 wherein the inflator includes an inflator body that is engageable with the enlarged end when the inflator is mounted to the panel in a mounted position, and wherein the inflator body is configured to be disengaged from the enlarged end when the inflator is disposed at least partially in the recess in a raised position different than the mounted position.

12. An air bag system comprising:
a panel having a recess;
an air bag disposed at least partially in the recess;
an inflator associated with the air bag for inflating the air bag, the inflator further being disposed at least partially in the recess and attached to the panel; and
a cover covering the air bag and configured to release the air bag when the air bag is inflated, the cover having a side wall with an enlarged end, the enlarged end being trapped by and between the inflator and the panel to secure the cover to the panel.

13. The system of claim 12 wherein the enlarged end extends into the recess, and wherein the panel includes a projection engaged with the enlarged end.

14. The system of claim 13 wherein the cover has a main portion through which the air bag is deployable, and the side wall extends from the main portion, and wherein the projection of the panel is disposed between the enlarged end and the main portion of the cover when the inflator is mounted to the panel.

15. The system of claim 12 wherein the inflator includes an inflator body having a projection engaged with the enlarged end.

16. The system of claim 15 wherein the enlarged end is engaged with the projection and the panel.

17. The system of claim 12 wherein the panel includes a retainer that defines the recess, the retainer having a retainer projection engaged with the enlarged end, and wherein the inflator includes an inflator body having an inflator projection engaged with the enlarged end.

18. The system of claim 12 wherein the panel includes a rib engaged with the inflator for positioning the inflator within the recess.

19. The system of claim 12 wherein the cover includes an additional side wall having an additional enlarged end, the additional enlarged end being trapped between the inflator and the panel.

20. The system of claim 19 wherein the panel includes two retainer projections, and the inflator includes an inflator body having two inflator projections, and wherein each enlarged end is disposed between and engaged with a respective retainer projection and a respective inflator projection, such that each enlarged end is trapped between the inflator and the panel to thereby secure the cover to the panel.

21. The system of claim 12 wherein the panel is an instrument panel.

22. The system of claim 12 wherein the enlarged end is engaged with the inflator.

23. The system of claim 12 wherein the enlarged end is engaged with the inflator and the panel.

24. The system of claim 12 wherein the enlarged end extends into the recess and is engaged with the panel.

25. An air bag system comprising;
an instrument panel retainer including a main portion and an indented portion extending from the main portion, the main portion defining an appearance surface, the indented portion having first and second retainer side walls that cooperate to define a recess having first, second and third recess portions, each retainer side wall further defining a shoulder and a retainer projection;
an inflator connected to the instrument panel retainer and disposed at least partially in the first recess portion, the inflator including an inflator body having first and second inflator projections;
an air bag connected to the inflator and configured to be inflated by the inflator, the air bag being disposed at least partially in the second recess portion; and
a cover covering the air bag and configured to release the air bag when the air bag is inflated, the cover having a top portion disposed at least partially in the third recess portion and engaged with the shoulders, the top portion defining an appearance surface that is disposed adjacent to the appearance surface of the instrument panel retainer, the cover further having first and second side walls extending from the top portion, each side wall extending between a respective retainer projection and a respective inflator projection, each side wall further having an enlarged end disposed in the first recess portion, each enlarged end being engaged with a respective retainer projection and a respective inflator projection, such that the enlarged ends are trapped between the inflator and the instrument panel retainer to thereby secure the cover to the instrument panel.

26. The system of claim 25 wherein the retainer side walls are joined together proximate the inflator, and wherein the retainer side walls cooperate to define a rib engaged with the inflator and configured to position the inflator at least partially in the first recess portion.

27. An air bag assembly for mounting on a panel having a recess, the assembly comprising:
an air bag adapted to be positioned at least partially in the recess;
an inflator associated with the air bag for inflating the air bag, the inflator being adapted to be positioned at least partially in the recess and mounted to the panel; and
a cover configured to cover the air bag and to release the air bag when the air bag is inflated, the cover having a side wall with an enlarged end, the enlarged end being configured to be trapped between the inflator and the panel when the inflator is mounted to the panel, so as to secure the cover to the panel;
wherein the inflator has an inflator body including a projection, and wherein the enlarged end is engageable with the projection and the panel when the inflator is mounted to the panel.

* * * * *

UNITED STATES PATENT AND TRADEMARK OFFICE
CERTIFICATE OF CORRECTION

PATENT NO. : 6,851,704 B2
DATED : February 8, 2005
INVENTOR(S) : Joseph J. Davis, Jr. et al.

It is certified that error appears in the above-identified patent and that said Letters Patent is hereby corrected as shown below:

Column 4,
Line 13, after "such that the", delete "enlarger" and insert -- enlarged --.

Signed and Sealed this

Twenty-fourth Day of May, 2005

JON W. DUDAS
*Director of the United States Patent and Trademark Office*